May 15, 1923.
A. C. ELLIOTT
1,455,576.
EMERGENCY BRAKE
Filed May 12, 1920
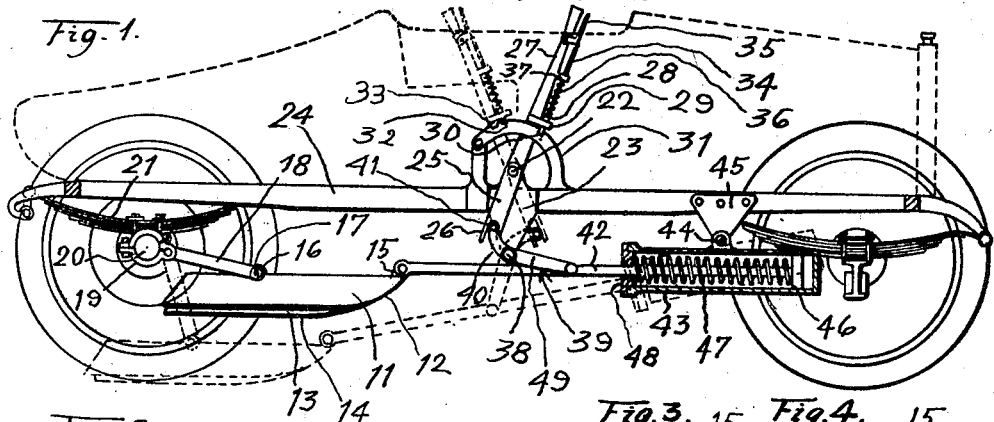
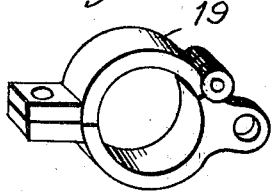
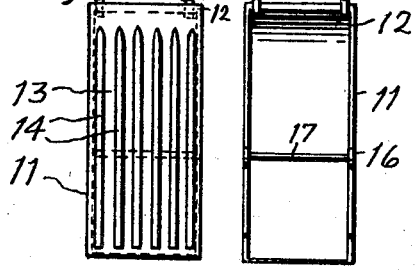
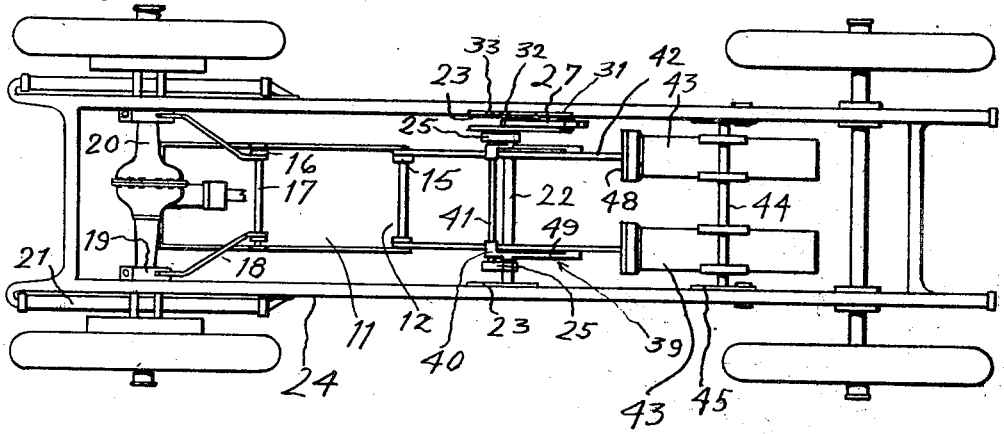
Inventor:
Auren C. Elliott
By Atty.

Patented May 15, 1923.

1,455,576

UNITED STATES PATENT OFFICE.

AUREN C. ELLIOTT, OF LOS ANGELES, CALIFORNIA.

EMERGENCY BRAKE.

Application filed May 12, 1920. Serial No. 380,833.

*To all whom it may concern:*

Be it known that I, AUREN C. ELLIOTT, a citizen of the United States, residing in the city and county of Los Angeles and State of California, have invented a new and useful Emergency Brake, of which the following is a specification.

This invention relates to an improved ground or emergency brake for motor vehicles, and has for its objects the provision of improved means for placing the device in operative position, and the provision of an improved device to prevent skidding of the motor vehicle, to prevent side-slipping thereof, and to provide an efficient brake that may be operated independently with reference to the ordinary service brake, and to provide an efficient brake that may be applied to effect a quick stop without the usual resultant wear on the tires of the vehicle.

Another object of this invention is to provide a simple and efficient brake that is positive and efficient in use, and that may be applied without undue strain on the vehicle chassis or tire.

Other objects and advantages may appear in the subjoined detail description.

The mechanism illustrated herein and embodying my invention, is quick to manipulate and well adapted to serve the purposes for which it is intended, but no limitation is made to the precise construction exhibited in the drawings, it being understood that changes, alterations and modifications within the scope of the appended claim, may be made if desired.

In the annexed drawings, Figure 1 is a side elevation of an automobile chassis showing my improved emergency brake applied thereto. Fig. 2 is a perspective view of a clamp by which the brake is attached to the rear axle of the automobile. Fig. 3 is a bottom plan view of the brake element. Fig. 4 is a top plan view of the brake element. Fig. 5 is a top plan view of the vehicle chassis with the brake attached thereto.

Referring to the drawings, the brake shoe 11 is constructed with a rounded front portion 12, and provided on the bottom 13, with longitudinally disposed ribs 14, serving, when the brake is in operative position, to prevent skidding and side-slipping of the vehicle. The shoe 11 is provided with projecting hinge knuckles 15 and 16; a pintle rod 17 being mounted in the knuckles 16. Links 18, pivotally connected to rod 17, have their opposite ends pivotally connected to the clamping elements 19, which are adapted to be secured to the rear axle 20, of the vehicle, and adjacent to the rear vehicle springs 21, so that the shoe 11, in operative position, is more rigidly and efficiently supported to prevent side motion of the vehicle.

Means for actuating the brake to operative and inoperative position consist of a pivot shaft 22 rotatively mounted on members 23, which are secured to the vehicle frame 24. The shaft 22 is provided with two levers 25, having slotted ends 26. The hand lever 27, fixed to shaft 22, is provided with a plunger 28, working in the projecting guide 29, and adapted to engage with the notch 30 in the segmental rack 31, in inoperative position, and with notches 32 and 33, in operative position. A rod 34 extends from the plunger 28 to the releasing latch 35, and a spring 36 is interposed between the plunger 28 and a lug 37 projecting from the lever 27. A transversely extending rod or shaft 38 is pivotally mounted in members 23, and is disposed beneath shaft 22. The shaft 38 is provided with two fixed levers 39, having the short arms 40 thereof, connected by rod 41, working in slots 26, in levers 25. Piston rods 42, pivotally connected to knuckles 15, extend within the cylinders 43, pivotally mounted in the transverse bar 44, extending between brackets 45. Rods 42 are provided with pistons 46, and springs 47 are interposed between the pistons 46 and cylinder heads 48. Piston rods 42, are pivotally connected to the relatively long arms 49, of levers 39.

In use, the manually operated lever 27 is pulled rearward to throw the brake shoe to the operative position. As the brake shoe makes the contact with the ground, the springs 47, serve to cushion the jar and strain upon the vehicle frame. To place the brake member in inoperative position, the lever 27 is thrown forward until the plunger 28 engages with the notch 30, in the rack 31. Springs 47 further assist when the brake shoes are actuated to inoperative position.

The brake shoe and operative mechanism therefor, including the buffing cylinders, are adapted to be mounted beneath the vehicle motor and the jack-shaft connecting the motor and the rear vehicle axle.

From the foregoing description it may be seen that I have constructed a simple and efficient non-skid apparatus and emergency brake for automobiles, which may be readily operated by the vehicle driver to the operative and inoperative position, and in which a spring buffing mechanism avoids all unusual jar which would be otherwise occasioned by the sudden application of a brake member to contact with the ground.

What is claimed is:

The combination with an automobile chassis including a frame and front and rear axles, of a brake shoe adapted to contact with the ground, clamps on the rear axle, links connecting the brake shoe with the clamps on the rear axle and mounted so that the shoe swings to operative position slightly forward of the rear axle, piston rods connected to the shoe and extending relatively forward thereof, piston cylinders pivotally mounted relative to the frame, pistons on said piston rods and working within said cylinders, springs interposed between the pistons and the cylinder heads, bearing members fixed to the frame, a transverse shaft journalled in the bearing members, rock-levers fixed to the transverse shaft, and having relatively long arms and short arms, said long arms being pivotally connected to said piston rods, a rod connecting the extremities of the short arms, a transversely extending shaft journalled in said bearing members and extending above the first-named transverse shaft, a manually manipulated lever for actuating the last-named transverse shaft, lever arms fixed to the manually manipulated shaft and having slotted ends in engagement with the transverse rod connecting the rock levers, a notched segmental rack adjacent to the manual lever, and a spring actuated plunger mounted on the manual lever and adapted to engage with the notches in the segmental rack to maintain the brake shoe in operative and inoperative positions.

In testimony whereof, I hereunto affix my signature this 6th day of May, 1920.

AUREN C. ELLIOTT.